United States Patent [19]

Schwager

[11] Patent Number: 5,286,181
[45] Date of Patent: Feb. 15, 1994

[54] EXTRUSION APPARATUS HAVING A NOZZLE-HEADED DRUM

[75] Inventor: Jules Schwager, Palatine, Ill.

[73] Assignee: Berndorf Belt Systems, Inc., Schaumbur, Ill.

[21] Appl. No.: 693,235

[22] Filed: Apr. 26, 1991

[51] Int. Cl.⁵ .................... A23G 3/02; B29B 9/00
[52] U.S. Cl. ........................ 425/8; 425/217; 425/382 R; 425/382.3; 425/464; 264/13
[58] Field of Search ............... 264/13; 425/6, 8, 215, 425/217, 377, 381, 382 R, 382.3, 447, 449, 464

[56] References Cited

U.S. PATENT DOCUMENTS

| | | | |
|---|---|---|---|
| 2,093,407 | 9/1937 | Baker | 264/118 |
| 2,340,501 | 2/1944 | Aasted | 222/271 |
| 2,576,977 | 12/1951 | Stober | 264/52 |
| 2,653,350 | 9/1953 | Piperoux | 425/313 |
| 2,904,827 | 9/1959 | Kaiser et al. | 264/141 |
| 2,958,099 | 11/1960 | Chisholm et al. | 425/382 R |
| 2,963,821 | 12/1960 | Baker | 83/177 |
| 2,979,764 | 4/1961 | Andrew | 425/6 |
| 3,003,193 | 10/1961 | Chisholm | 264/141 |
| 3,208,101 | 9/1965 | Kaiser et al. | 425/6 |
| 3,282,066 | 11/1966 | Searight | 425/6 |
| 3,288,892 | 11/1966 | Bewley et al. | 264/13 |
| 3,346,915 | 10/1967 | Fleischer et al. | 425/6 |
| 3,419,934 | 1/1969 | Lovett | 425/4 R |
| 3,469,281 | 9/1969 | Payne | 425/464 |
| 3,534,434 | 10/1970 | Zavaskik | 425/357 |
| 3,642,393 | 2/1972 | Ross et al. | 425/6 |
| 3,702,748 | 11/1972 | Storb et al. | 425/6 |
| 3,880,566 | 4/1975 | Komarek et al. | 425/362 |
| 3,973,890 | 8/1976 | Porter et al. | 425/144 |
| 4,029,459 | 6/1977 | Schmiedeke | 425/202 |
| 4,154,379 | 5/1979 | Schermutzki | 222/420 |
| 4,279,579 | 7/1981 | Froeschke | 425/6 |
| 4,559,000 | 12/1985 | Froeschke | 264/140 |
| 4,623,307 | 11/1986 | Froeschke | 425/464 |
| 4,850,833 | 7/1989 | Pinto et al. | 425/6 |
| 5,013,498 | 5/1991 | Froeschke | 425/6 |
| 5,032,075 | 7/1991 | Conte | 426/515 |

FOREIGN PATENT DOCUMENTS

| | | |
|---|---|---|
| 1208405 | 7/1986 | Canada. |
| 1220910 | 4/1987 | Canada. |
| 1238160 | 6/1988 | Canada. |
| 12192 | 6/1980 | European Pat. Off.. |
| 166200 | 1/1986 | European Pat. Off.. |
| 363975 | 4/1990 | European Pat. Off.. |
| 477164 | 3/1992 | European Pat. Off.. |
| 1085139 | 7/1960 | Fed. Rep. of Germany. |
| 1287045 | 1/1969 | Fed. Rep. of Germany. |
| 1767381 | 10/1971 | Fed. Rep. of Germany. |
| 3834785 | 5/1989 | Fed. Rep. of Germany. |
| 60-212166 | 10/1985 | Japan. |
| 63-218240 | 9/1988 | Japan. |
| 2-95429 | 4/1990 | Japan. |
| 2-95430 | 4/1990 | Japan. |
| 2-99133 | 4/1990 | Japan. |
| 2-258045 | 10/1990 | Japan. |
| 2-258046 | 10/1990 | Japan. |
| 2-258047 | 10/1990 | Japan. |
| 251809 | 2/1970 | U.S.S.R. ................ 425/6 |
| WO87/06880 | 11/1987 | World Int. Prop. O.. |

Primary Examiner—Jay H. Woo
Assistant Examiner—James P. Mackey
Attorney, Agent, or Firm—McAndrews, Held & Malloy, Ltd.

[57] ABSTRACT

An apparatus for extruding a mass onto a moving support mechanism. A first cylinder for receiving the mass within its interior has an exit channel through which the mass is forced. A second cylinder is disposed about the first cylinder for relative rotation with respect to the first cylinder. The second cylinder includes a plurality of forming channels which repeatedly aligned with the exit channel of the first cylinder during relative rotation of the cylinders and through which the mass is forced. A plurality of nozzles are formed in the outer surface of the second cylinder and are shaped and arranged for guiding the excess mass away from the exit ends of the forming channels during at least a portion of the rotational movement of said second cylinder and for guiding the excess mass into the extruded mass at the extruding position of the apparatus.

29 Claims, 3 Drawing Sheets

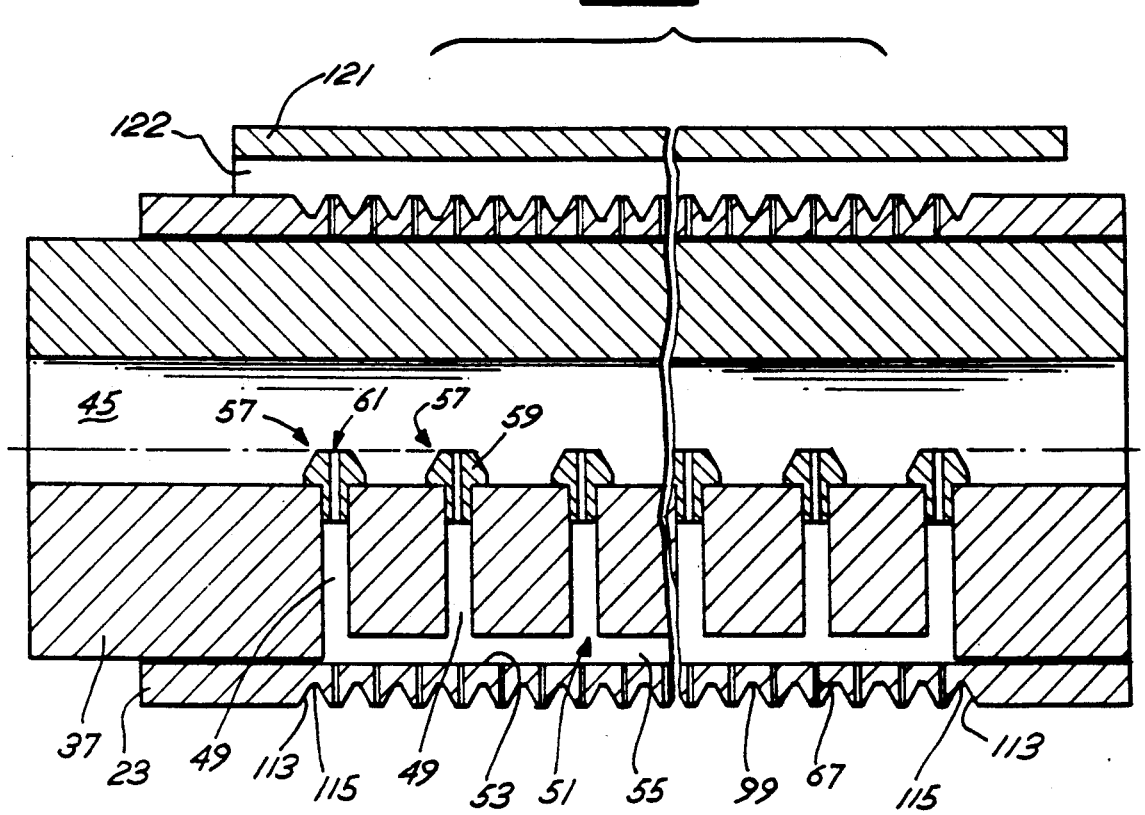
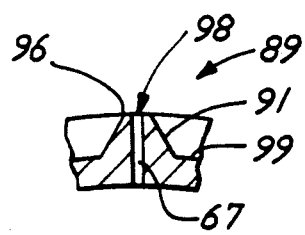
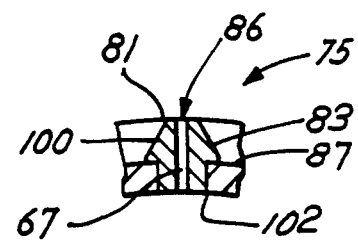

EXTRUSION APPARATUS HAVING A NOZZLE-HEADED DRUM

BACKGROUND OF THE INVENTION

The present invention relates to an apparatus for extrusion of a flowable mass onto a moving surface, and more particularly relates to the control and recycling of excess mass which fails to properly extrude from a double cylinder extrusion apparatus.

A variety of apparatus for extruding a mass onto a moving support mechanism are known. One such apparatus is shown in U.S. Pat. No. 4,279,579 ("the '579 patent), the teachings of which are incorporated herein by reference.

The extrusion apparatus described in the '579 patent utilizes two concentric cylindrical containers. The inner container receives the mass to be extruded and has a row of apertures or a slot which faces in the direction of a moving conveyor belt. The outer container is designed to rotate about the inner container and has a plurality of apertures disposed throughout its surface. When the apertures in the surface of the outer container are aligned with the apertures or slot of the inner container, the mass to be extruded flows from the inner container, through the outer container and ultimately onto the moving conveyor. Since the outer container is rotating, it acts like a knife to separate the extruded matter from the apparatus so that it flows onto the conveyor in droplet or other forms.

An amount of excess mass typically tends to remain on the outer surface of the outer cylinder in the regions of the apertures after the mass has been extruded onto the conveyor. For this reason, the '579 patent teaches the use of a spatula to scrape the surface of the cylinder to force the excess mass back into the apertures of the outer cylinder. This method of removing the excess mass, however, is somewhat wasteful since much of the excess mass is not automatically recycled when the spatula merely functions as a scraper. Rather, the excess mass must be manually recycled once it has accumulated in, for example, a drum that receives the excess mass from the spatula. Furthermore, the excess mass may tend to clog the apertures in the outer cylinder when it is forced back by the spatula.

A further embodiment of the '579 patent is directed to creating a negative pressure in the interstitial region between the inner and outer cylinders. However, the pressure, if any, so generated must be sufficient to draw or suck the amount of excess material back into the region. Thus, where the amount of excess material is significant, the pressure may not be sufficient to draw all of the excess mass therein.

It is therefore an object of the present invention to improve the performances of a double cylinder extruding apparatus in order to automatically recycle the excess mass which fails to properly extrude onto the moving support mechanism.

SUMMARY OF THE INVENTION

This and other objects of the present invention are achieved in a particular nozzle structure and guide surface arrangement carried by the outer cylinder of a double cylinder extrusion apparatus. Guide surfaces guide any excess mass which is not properly extruded away from the exit ends of forming channels located in the outer cylinder. The excess mass is controlled by the guide surfaces under the influence of gravity, adhesive and centrifugal forces during rotation of the outer cylinder, to be guided to the exit ends of the forming channels during a subsequent extrusion where it is combined with the mass extruded from the forming channels to form the mass onto the moving support mechanism.

BRIEF DESCRIPTION OF THE DRAWINGS

FIG. 4 is a cross-sectional front view of the extrusion apparatus of FIG. 2

FIG. 5 is a cross-sectional side view of one embodiment of a nozzle for use with the extrusion apparatus of FIG. 2.

FIG. 7 is a cross-sectional side view of another embodiment of a nozzle for use with the extrusion apparatus of FIG. 2.

DESCRIPTION OF THE PREFERRED EMBODIMENT

Figure 1:
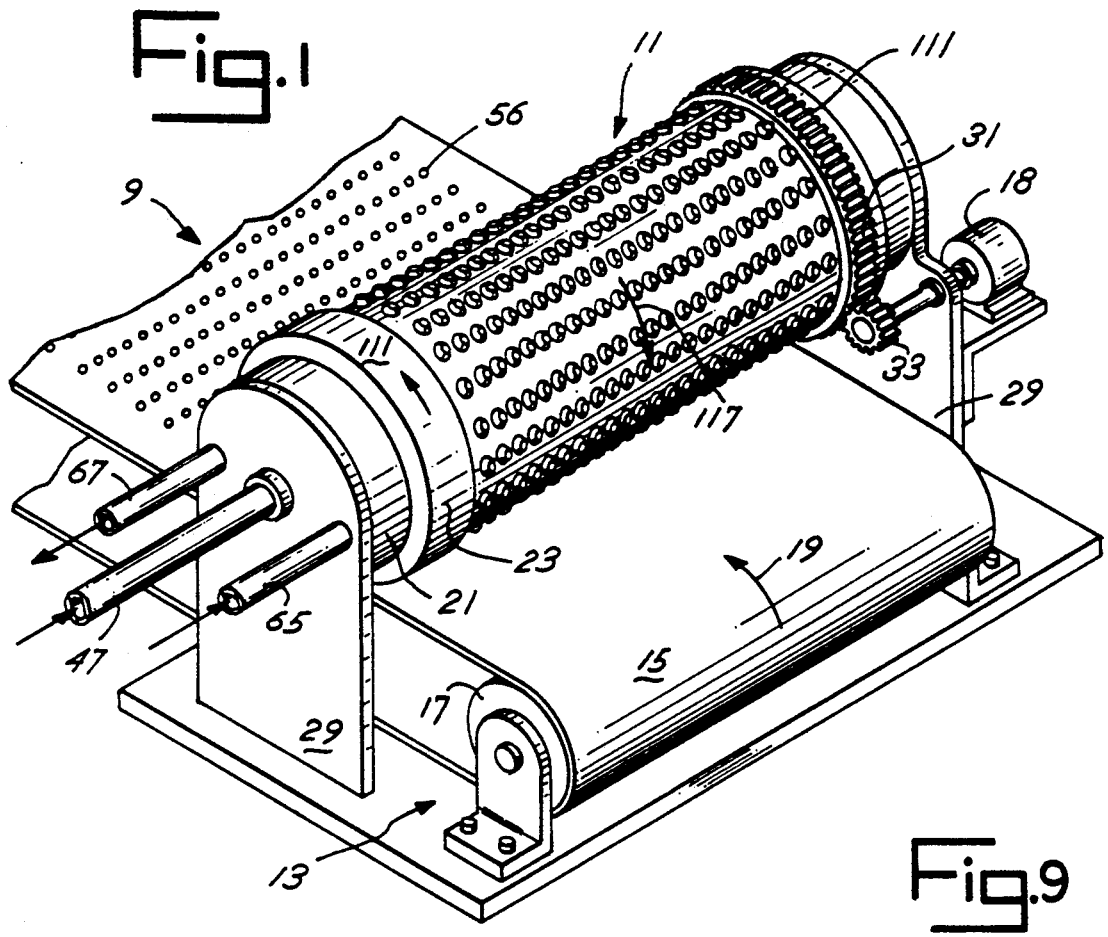
FIG. 1 is a perspective view of an embodiment of an extrusion system of the present invention.

Referring to FIG. 1, an extrusion system 9 includes an extrusion apparatus 11 which is disposed above a moving support mechanism 13. Mechanism 13 includes a conveyor belt 15 which may be in the form of a continuous loop having end rollers 17 (only one shown) disposed at opposite ends of the loop. Conveyor belt 15 is propelled by a drive motor (not shown) for movement of the belt in the direction of arrow 19.

Figure 2:
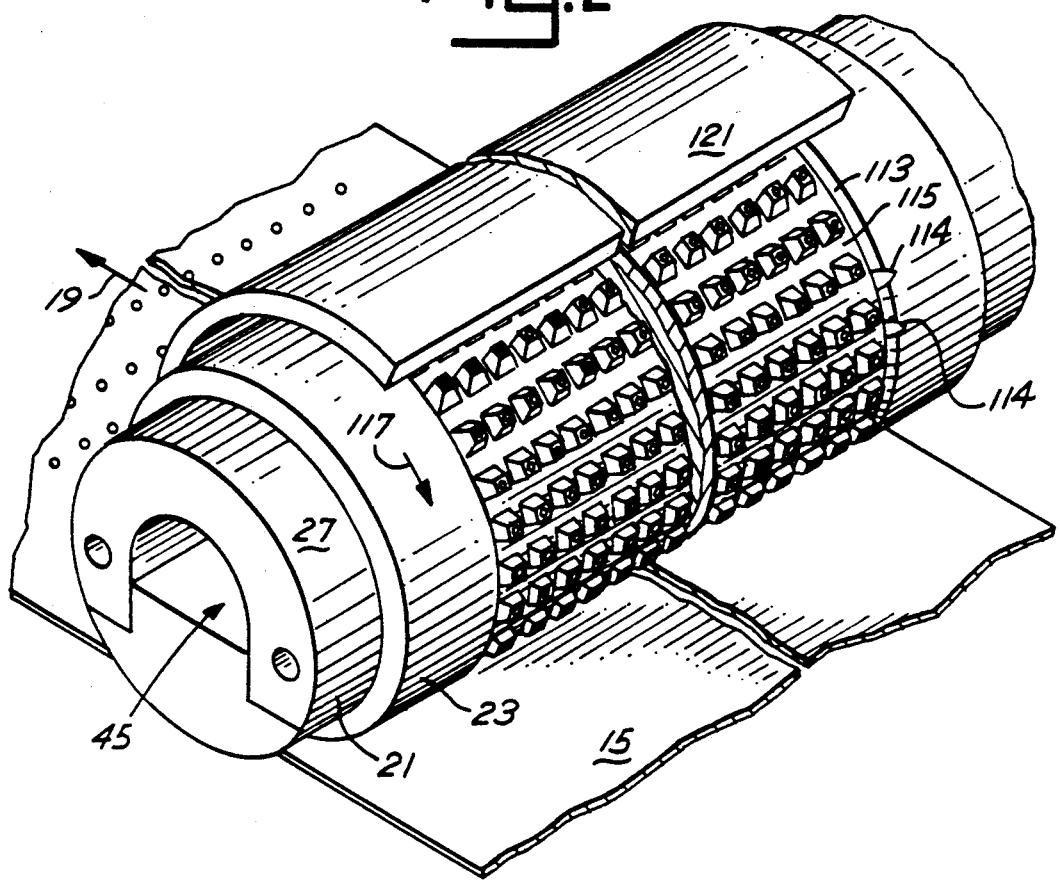
FIG. 2 is a perspective view of an extrusion apparatus of the system of FIG. 1.
Figure 3:
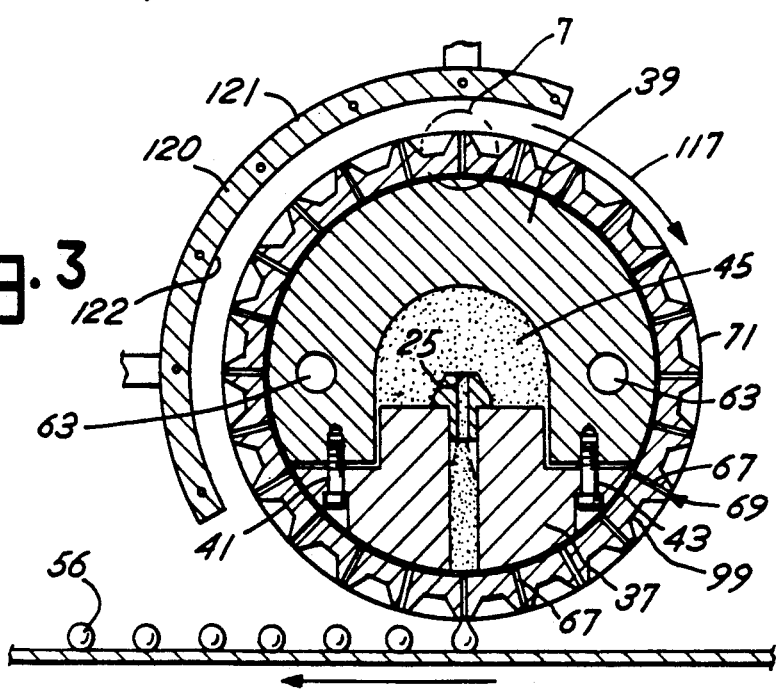
FIG. 3 is a cross-sectional side view of the extrusion apparatus of FIG. 2.

Referring to FIGS. 2 and 3, extrusion apparatus 11 is formed of a pair of concentric cylinders 21, 23 which are disposed about an axis 25 (FIG. 3). Outer cylinder 23 rides on the outside cylindrical surface 27 of the inner cylinder 21. Surface 27 serves as a bearing surface permitting relative rotation of the two cylinders 21,23.

In the embodiment described herein, the first or inner cylinder 21 is held in a fixed position by support members 29 diagrammatically represented in FIG. 1. Support members 29 may be formed of any structural supports sufficient to fixed the position of inner cylinder 21 over top of and in registration with conveyor belt 15.

The second or outer cylinder 23 forms a rotatable shell surrounding the stationary inner cylinder 21. Rotation of the outer cylinder 23 is facilitated by a toothed rim member 31 (FIG. 1) disposed on the outer periphery of cylinder 23 at one end and along its complete circumference. A pinion 33, driven by a drive motor 18, engages toothed rim member 31 causing rotation of the outer cylinder as motor 18 is driven. As will suggest itself, other means may be utilized to rotate the outer cylinder relative to the inner cylinder.

As shown in FIG. 3, the stationary cylinder 21 is constructed from a base member 37 and an internal temperature control member 39. The two members 37, 39 are secured to one another by two pairs of bolt fasteners 41,43, or by other means as will suggest itself.

Base member 37 and internal temperature control member 39 have outer cylindrical surface parts which together form the outer cylindrical surface 27. The interior portion of the two members 37,39 is shaped to define an axial passageway 45 which passes throughout a substantial length of stationary cylinder 21. The viscous mass is supplied under pressure to passageway 45 by a supply line 47 (FIG. 1). Supply line 47 is connected to one end of stationary cylinder 21 for feeding the viscous mass into axial passageway 45.

As shown in FIG. 4, base member 37 of the stationary cylinder includes a plurality of radial passages 49 which extend downwardly from axial passage 45. Each radial passage 49 forms part of an exit channel through which the viscous mass may be forced out of the inner cylinder. Exit ends 51 of each passage 49 supply the viscous mass against the inside cylindrical surface 53 of rotating outer cylinder 23. A manifold channel 55 forms a part of the exit channel and is disposed between the exit ends of passage 49 and the rotating cylinder 23, for providing a continuous area or slot along the inside surface of cylinder 23. Manifold channel 55 keeps the mass to be extruded at a constant pressure along the length of the channel. This ultimately improves the uniformity of the mass droplets 56 which are extruded onto the conveyor belt. As will suggest itself, manifold channel 55 need not be included and if not, passages 49 should number and align with the forming channels, described below. As will suggest itself, other shapes may be given to the exit channel of the inner cylinder 21.

As shown in FIG. 4, passage fittings 57 are placed at the mouth end of each radial passage 49. Passage fittings 57 include a frustoconical cap 59 and have a channel 61 extending the length of the fitting. The purpose of the fittings 57 is to equalize pressure distribution. In addition, channel 61 extends the mouth end of passage 49 above the floor of passageway 45 permitting sediment in the mass to drop to the floor of the passageway 45. Thus, the sediment will not clog the opening into passage 49. In other applications, however, it may be desirable to place a mixer element or rake within passageway 45 in order to keep solids within the mass in suspension. In such a case, the mouth opening of passage 49 will need to be flush with the floor of passageway 45.

Referring again to FIG. 3, internal temperature control member 39 is preferably constructed from a heat/cold conductive material, for example, stainless steel. Thermal duct 63 is provided within the body of temperature control member 39. Duct 63 forms a loop (not shown) at the opposite end of member 39, providing a single continuous passage into and out of member 39. A thermally conductive medium, for example, steam, thermal oil, hot water or refrigerant, is moved through duct 63 via fluid input and output lines 65,67 (FIG. 1).

The thermally conductive medium is used to either heat or cool the internal temperature control member, as desired. Since it is in contact with the mass to be extruded, the internal temperature control member heats or cools the mass to thereby maintain the mass at a desired viscosity.

Outer cylinder 23 is constructed from metal, for example steel. Cylinder 23 includes a plurality of forming channels 67 (FIG. 3) which pass through the outer cylinder for communicating the inside surface to the outside surface of the cylinder. The exit ends 69 of the forming channels 67 are formed on the outer cylindrical surface 71 of cylinder 23. The area of the cylinder which surrounds each exit end is cut away by machining of the cylinder, or by molding of the cylinder, etc. This machining forms nozzle-like structures 75 (FIG. 5) into the outer surface of the cylinder.

Figure 6:
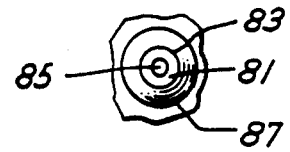
FIG. 6 is a top view of the nozzle of FIG. 5.

One embodiment of a nozzle-like structure 75 is shown in FIGS. 5 and 6, wherein the nozzle 75 has a conical-like or frustoconical shape, as shown. The nozzle 75 is formed to include a top surface 81 which is disposed in the plane of the outer cylindrical surface 71 (FIG. 3) of the outer cylinder 23. Nozzle 75 is further formed to include a conical shaped guide surface 83 having a conical axis 85. Guide surface 83 slopes convergently toward the exit end 86 of the respective forming channel 67. At the base of nozzle 75, the guide surface 83 intersects a valley surface 87. Valley surface 87 lies in a cylindrical plane and interconnects each of the nozzles 75 as shown in FIG. 1. FIG. 1 illustrates frustoconical shaped nozzles.

Figure 8:
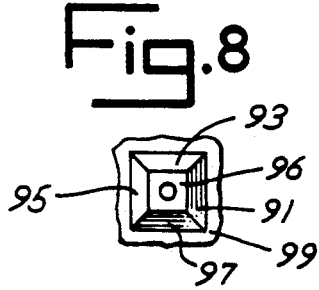
FIG. 8 is a top view of the nozzle of FIG. 7.

Another embodiment of a nozzle-like structure 89 is shown in FIGS. 7 and 8. Nozzle 89 is constructed in a pyramidal-like shape or frustopyramidal in shape. Nozzle 89 includes four guide surfaces 91,93,95,97 which angle in a convergent fashion toward the exit end 98 of the forming channel 67. At the base of nozzle 89, the guide surfaces 91–97 intersect a valley surface 99. Valley surface 99 lies in a cylindrical plane and interconnects each of the nozzles 89 as shown in FIG. 2. FIG. 2 illustrates frustopyramidal shaped nozzles.

If desired, the nozzles 75 or 89 may be formed as separate units 100 (FIG. 5) which are secured to the outer cylinder 23. The separate nozzle units 100 are inserted into a plurality of bores 102 passing through the cylinder 23. Nozzle units 100 may include threads for screw securement into the bores 102, which could also be threaded, or may be secured within the bores by other means including welding etc.

In an example embodiment, a cylinder 23 is approximately 0.35 inches in thickness and is machined to produce twenty-four (24) equally circumferentially spaced rows of like frustopyramidal nozzles. Each nozzle has an approximate height of 0.25 inches above the valley surface. It is desired that the nozzles be placed close together to make efficient use of space while still providing a trough of a size sufficient to receive the excess mass. Also, it is preferred that the droplets are spaced such that they do not flow into each other after or during extrusion. The forming channels have a diameter which will depend on the size of the droplet to be formed and the of the mass, generally 1.5 mm to 3.0 mm in diameter.

Figure 9:
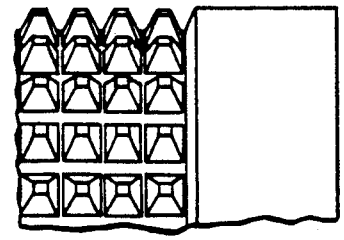
FIG. 9 is a partial side view of one embodiment of the outer cylinder of the extrusion apparatus of FIG. 2.

Referring again to FIG. 2, the nozzles are arranged along the outer surface of cylinder 23 defining guide surfaces and troughs which surround the exit ends of the forming channels. The troughs are formed of interconnected guide surfaces and the valley surface. These nozzles are preferably arranged into a plurality of longitudinal rows which rows are equally spaced around the circumference. FIG. 3 illustrates 24 rows. The spacing between adjacent channels 67 between circumferential rows is preferably the same as the longitudinal spacing between adjacent channels 67 in the same row. That is, it is preferred to have a square pattern of the droplets being extruded. As seen in FIG. 9, an arrangement may be used where there is more valley surface between adjacent circumferential rows than between adjacent nozzles in the same row.

As shown in FIG. 1, a border region 111 lies at each end of outer cylinder 23. Each border region 111 is formed of a smooth cylindrical surface and is devoid of extruding nozzles. (Toothed rim member 31 lies on one of the border regions 111). The diameter of the cylinder 23 at the border regions is greater than the diameter of the cylinder at the valley surfaces immediately adjacent the respective border region. An annular angular blocking surface 113 (FIGS. 2 and 4) is formed between each border region 111 and the valley surface 115 that are immediately adjacent the respective border regions.

In operation of the apparatus, the mass to be extruded is supplied under pressure through the mass supply line 47 (FIG. 1) and into the axial passageway 45 (FIG. 4) of the stationary cylinder 21. Inside the stationary cylinder, the internal temperature control member 39 assists in keeping the mass to be extruded at a specified temperature which, in turn, maintains the mass at the desired viscosity. The temperature of the internal temperature control member 39 is dependent on the temperature of the heating or cooling medium flowing through the thermal ducts 63.

The mass to be extruded flows from the axial passageway 45 and into the radial passages 49 (FIG. 4) and therefrom into the manifold channel 55 which keeps the mass to be extruded at a constant pressure along the length of the channel 55.

The outer cylinder 23 rotates about the stationary cylinder in the direction designated by arrow 117 (FIG. 3). If the rotation rate is constant, there is a periodic alignment/misalignment between the forming channels 67 of the outer cylinder and the exit channel 49,55 of the stationary cylinder. When the channels are in substantial alignment, the mass is extruded from the manifold channel 55, through the forming channels 67 and onto the moving conveyor belt 15 where the mass takes on the form of a droplet 56, as shown in FIG. 3. Forms other than a droplet form may be obtained by altering, e.g., the shape of the forming channels 67.

Typically, a certain amount of excess mass remains at the exit ends 69 (FIG. 3) (86 in FIG. 5; 98 in FIG. 7) of the forming channels 67 of the nozzles once the particular row of nozzles has extruded a mass onto the conveyor belt. Being fluid and viscous, this excess mass flows along the guide surfaces 83 (FIG. 5) of the nozzles toward and away from the valley surface 87 under the influence of gravity, as well as the adhesive forces attracting the mass to the surface of the cylinder, as well as the centrifugal force provided by the rotation of the cylinder, as the cylinder is continuously rotated. The valley surface and guide surfaces of the plurality of nozzles thus function as troughing which accepts this excess mass. The excess mass is moved away from the particular exit end 67 from which the excess mass was extruded by the force of gravity.

With the assistance of gravity, and the adhesive and centrifugal forces, the troughing guides the excess mass toward the lowest portion, the vertical bottom, of the cylinder where a row of nozzles has moved into an extruding position and is extruding the mass droplets onto the conveyor belt. As the excess mass approaches the extruding position, the excess mass proceeds downwardly along the guide surfaces of the nozzles toward the exit ends of the nozzles where the excess mass combines with the mass being extruded to form the mass droplets.

The excess mass will adhere to the top surface 81 (FIG. 6) or 96 (FIG. 8) which surrounds the exit ends of the forming channels just after the droplet is extruded. As the cylinder 23 rotates, the excess mass will first move under the force of gravity into the troughs (particularly, beginning after the cylinder passes its first 90 degrees of rotation from the extruding position) and then the mass will be carried around the cylinder toward the lowest position, i.e., the extruding position. As the cylinder rotates through its last 90 degrees, just prior to the extruding position, gravity and centrifugal force moves the excess mass outwardly toward the tip or exit end of the nozzles where it combines with the mass being extruded from the nozzles. However, depending on the spacing between nozzles, the viscosity of the mass, etc., some of the excess mass may move between nozzles of the same row during the first 180 degrees of rotation and be guided back by gravity to the extruding position where this excess mass will combine with the mass being extruded.

As the outer cylinder rotates, the excess mass also exhibits a tendency to flow laterally in the direction of the border regions. It is for this reason that the blocking surfaces 113 are provided. These blocking surfaces serve to block the lateral flow of the excess mass into the border region. Surface 113 may be a planar conical-like surface, as best viewed from FIG. 4. Alternatively, grooves 114 (FIG. 2) may be machined between each row of nozzles, particularly if convenient due to the machining of the valley area between each row. Groove 114 is angled radially inwardly to the valley surface 115.

In order to flow properly, the excess mass must be fluid. The mass has a tendency to cool down and become more viscous. It is therefore desirable to provide a means for controlling the temperature of the excess mass to maintain it in its fluid state.

In one embodiment, a non-contact heater 121 is disposed in a spaced-apart relation from the exterior of the outer cylinder for this purpose. The non-contact heater 121 applies heat to the excess mass on the outer surface of the cylinder and serves to prevent its solidification. As shown in FIG. 3, the heater is located to cover at least from 90 degrees through 180 degrees of the rotation following the extruding position.

Heater 21 is formed of a metal member 120 through which a heated liquid is passed. The heated liquid heats member 120 causing heat to be radiated against the outer surface of cylinder 23. Heater 21 includes a flat curved surface 122 opposing the outer surface of cylinder 23. As will suggest itself, other heating means may be used.

Outer cylinder 23 is secured to and may be removed from the inner cylinder 21 by conventional means. Cylinder 23 may be retrofit onto a prior art inner cylinder of an extrusion system similar to that shown in the '579 patent.

While embodiments of the invention have been described hereinabove, those of ordinary skill in the art will recognize that the embodiments may be modified and altered without departing from the central spirit and scope of the invention. Thus, the embodiments described hereinabove are to be considered in all respects as illustrative and not restrictive, the scope of the invention being indicated by the appended claims, and all changes which come within the meaning and range of equivalency of the claims are intended to be embraced herein.

What is claimed is:

1. An apparatus for extruding a flowable mass onto a moving support mechanism comprising:
  a first cylindrical member for receiving a flowable mass to be extruded from within the interior of said first cylindrical member, said first cylindrical member having at least one exit area through which said mass is forced to the exterior of said first cylindrical member;

a second cylindrical member disposed about said first cylindrical member for relative rotation with respect to said first cylindrical member, said second cylindrical member including a plurality of forming channels having exit ends and being disposed for rotation into and out of an extruding position, and for alignment with said exit area of said first cylindrical member when said forming channels rotate into said extruding position, the alignment permitting the flowable mass to be forced through said forming channels, said second cylindrical member having an outer cylinder surface and including a border region on said outer cylinder surface, said border region being devoid of forming channels;

nozzle means formed into said outer surface for guiding excess mass which adheres to sad outer surface during rotation of the second cylindrical member towards said exit ends of at least one said forming channel moving into said extruding position, for merging said excess mass with a mass being extruded from said forming channels onto the moving support mechanism; and blocking surface means located between said border region and said plurality of forming channels for limiting lateral movement of said excess mass into said border region.

2. An apparatus according to claim 1 and further including heating means for heating said excess mass adhering on the outer surface of said second cylindrical member.

3. An apparatus according to claim 1 wherein said nozzle means includes a plurality of guide surfaces and at least one valley surface, at least one said guide surface being associated with one said forming channel for guiding excess mass emanating from the associated forming channel to said valley surface and for guiding said excess mass to the exit end of said one forming channels when occupying said extruding position.

4. An apparatus according to claim 1, wherein said nozzle means includes four guide surfaces surrounding an associated forming channel.

5. An apparatus according to claim 4 wherein said four guide surfaces are contiguous along two edges and shaped so as to form a substantially pyramidal configuration surrounding said associated forming channel.

6. An apparatus according to claim 5 wherein said outer cylinder surface forms a top surface surrounding said associated forming channel to provide a frustopyramidal configuration surrounding said forming channel.

7. An apparatus according to claim 1 wherein said plurality of forming channels are aligned in at least one row.

8. An apparatus according to claim 7 wherein said plurality of forming channels are aligned in plural rows equally spaced about the circumference of said outer cylinder surface.

9. An apparatus according to claim 8 wherein each of said rows has an equal number of forming channels.

10. A cylindrical shell for use in an apparatus that extrudes a mass onto a moving support mechanism as said cylindrical shell is rotated, said cylindrical shell comprising a plurality of nozzles having exit ends and being disposed about the outer surface of said cylindrical shell and adapted to receive a flow of a mass from within said cylindrical shell for extrusion through said nozzles, and a border region on said cylindrical shell and said border region being devoid of nozzles, said plurality of nozzles being shaped with guide surfaces and arranged on said shell for defining a plurality of troughs, each of said troughs receiving an amount of excess mass that has not been properly extruded onto said moving support mechanism and guiding said amount to the exit ends of said nozzles when said nozzles are extruding the mass; and blocking surface means located between said border region and said plurality of nozzles for limiting lateral movement of said excess mass into said border region.

11. A cylindrical shell according to claim 10, wherein each of said plurality of nozzles has a pyramidal shape.

12. A cylindrical shell according to claim 10, wherein each of said plurality of nozzles has a conical shape.

13. A cylindrical shell according to claim 10, wherein said plurality of nozzles are formed integral with said outer surface.

14. A cylindrical shell according to claim 10, wherein said plurality of nozzles are aligned in at least one row.

15. A cylindrical shell according to claim 14, wherein said plurality of nozzles are aligned in plural rows equally spaced along the circumference of said cylindrical shell.

16. A cylindrical shell according to claim 15, wherein each row has an equal number of nozzles.

17. An apparatus for extruding a flowable mass onto a moving support mechanism comprising:

a first cylindrical member having a passage for accepting a flowable mass to be extruded and further having at least one exit area;

a second cylindrical member disposed about said first cylindrical member for relative rotation with respect to said first cylindrical member, said second cylindrical member including a plurality of forming channels disposed for rotation into and out of an extruding position, and for alignment with said exit area of said first cylindrical member when said forming channels rotate into said extruding position, said alignment permitting the flowable mass to be forced through said forming channels;

a plurality of nozzles having exit ends and being disposed on the outer periphery of said second cylindrical member for channeling the mass to be extruded onto the moving support mechanism when at least one of said plurality of nozzles is in said extruding position, said plurality of nozzles being spaced from one another and being shaped with guide surfaces to define a trough for receiving therein excess mass that has not been properly extruded onto the moving support mechanism, said trough guiding excess mass to the exit ends of said nozzles when said nozzles are extruding the mass;

a border region on said second cylindrical member and being devoid of nozzles; and blocking surface means located between said border region and said plurality of nozzles for limiting movement of said excess mass into said border region.

18. An apparatus according to claim 17 and further including heating means for heating said excess mass on said second cylindrical member for putting said excess mass in a fluid state.

19. An apparatus according to claim 18, wherein each of said plurality of nozzles has a frustopyramidal shape.

20. An apparatus according to claim 18, wherein each of said plurality of nozzles has a conical shape.

21. An apparatus according to claim 17, wherein at least one of said plurality of nozzles is formed integral with said second cylindrical member.

22. An apparatus according to claim 17, wherein said plurality of nozzles are aligned in at least one row.

23. An apparatus according to claim 22, wherein said plurality of nozzles are aligned in plural rows equally spaced along the circumference of said second cylindrical member.

24. An apparatus according to claim 23, wherein each row has an equal number of nozzles.

25. An apparatus according to claim 17 wherein said first cylindrical member is stationary.

26. An apparatus according to claim 17 wherein said first cylindrical member comprises:

a base member; and an internal temperature control member for controlling the temperature of the mass to be extruded.

27. An apparatus according to claim 26, wherein said internal temperature control member includes a passage for accepting a thermally conductive medium therethrough.

28. An apparatus according to claim 17 and further including a means for controlling the temperature of said excess mass.

29. An apparatus as recited in claim 28 wherein said means for controlling the temperature of said excess mass is a non-contact heater disposed proximate to said second cylindrical member.

* * * * *